Nov. 26, 1968
D. B. SHORE
3,412,756
POPPET VALVE HAVING OPPOSITELY DIRECTED
SPHERICAL SEATING SURFACES
Filed Aug. 6, 1965
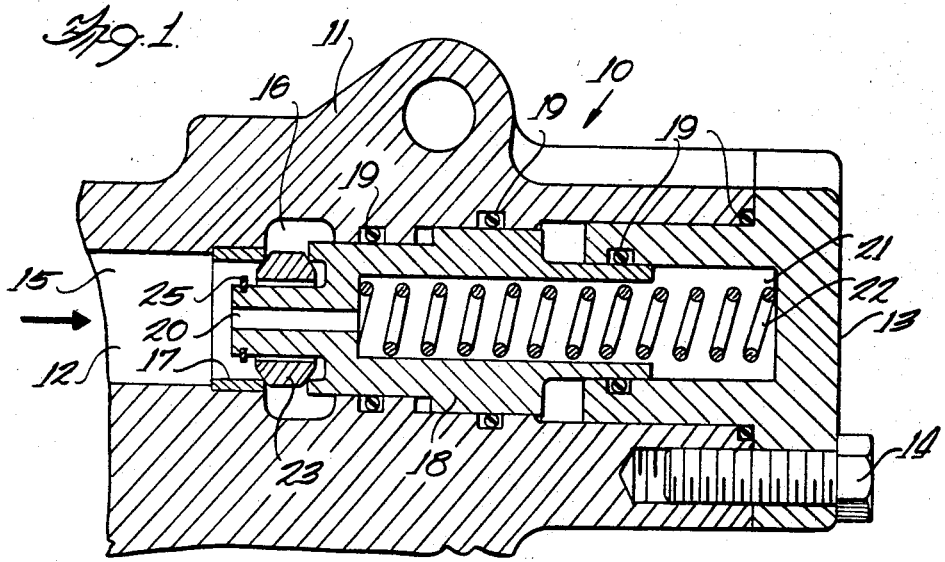
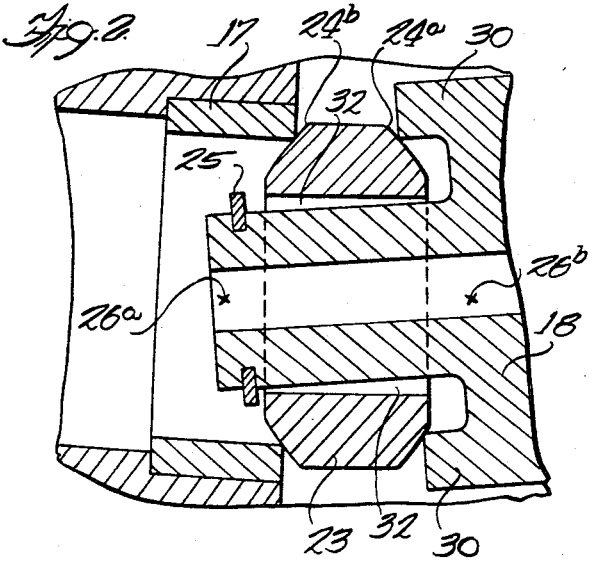
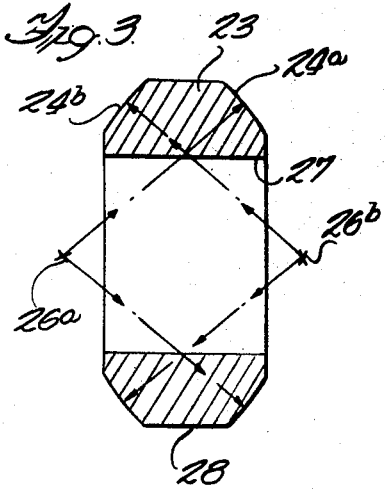
Inventor
Daniel B. Shore
Robert B. Gin
Attorney

United States Patent Office 3,412,756
Patented Nov. 26, 1968

3,412,756
POPPET VALVE HAVING OPPOSITELY DIRECTED SPHERICAL SEATING SURFACES
Daniel B. Shore, Niles, Ill., assignor to International Harvester Company, Chicago, Ill., a corporation of Delaware
Filed Aug. 6, 1965, Ser. No. 477,724
1 Claim. (Cl. 137—540)

ABSTRACT OF THE DISCLOSURE

A poppet valve incorporating a valve stem carrying a floating portion having longitudinally spaced spherical surfaces. One spherical surface seals with a valve seat while the other surface seals with a shoulder on the valve stem.

---

This invention relates to hydraulic valves and more particularly to a poppet valve having a floating nose portion which cooperates with a valve seat to make a fluid tight seal.

As is well known in the art a poppet valve in a hydraulic system is a valve which rises perpendicularly to or from its seat, opening and closing a fluid flow passage thereby allowing or restricting fluid flow in the hydraulic circuit. While poppet valves are old in the art, it has long been a problem to mass produce a valve which provides a positive fluid seal and yet operates smoothly and efficiently because of the necessity of close tolerances and exacting materials and machining. When the poppet valve is a solid, one-piece unit the centers of the bore of the valve cylinder and poppet must be exactly concentric to permit the poppet nose to seat fluid tight. This problem can be overcome by providing the poppet valve with a floating nose to allow movement at the valve seat thus permitting the poppet valve to correct for any inaccuracies in manufacture and provide a fluid tight seal.

It is therefore an object of the present invention to provide a poppet valve which will provide a fluid tight seal and still allow mass production and reasonable manufacturing tolerances in the valve construction.

Another object of the present invention is to provide a poppet valve having a floating nose portion assembled on the valve stem to make a fluid tight hydraulic valve which is simple in operation and economical in construction.

Still another object of the present invention is to provide a multiple piece poppet valve unit having a spherical valve head for insuring positive fluid sealing against a standard valve seat.

Yet another object of the present invention is to provide a poppet valve which is self-compensating for misalignment between the center line of the valve stem and the center line of the valve bore to provide a positive fluid tight valve.

Other objects and advantages will become readily apparent from the following detailed description taken in connection with the accompanying drawing, in which:

FIGURE 1 is a sectional side elevation of a poppet valve having a floating nose portion;

FIGURE 2 is an enlarged sectional side elevation of the floating nose portion and valve seats illustrating the floating nose sealing feature with a misalignment of parts; and FIGURE 3 is a cross sectional view of the floating nose portion showing one possible location of the centers of the spherical valve head.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claim.

Referring now to the drawings, FIGURE 1 illustrates a poppet valve unit 10 which includes a housing 11 having a bore 12 therein. An end piece 13 is attached to one end of the housing 11 as by a bolt 14. Inlet 15 is represented by a flow arrow and the outlet of the valve unit is connected to chamber 16. Seating means 17 are positioned in bore 12 as is well known in the art. A valve stem 18 is positioned in bore 12 as shown between the seating means 17 and the end piece 13. The valve stem is sealed from fluid leakage as by seals 19 as is well known in the art. The valve stem 18 further includes a hole 20 which feeds from the inlet side of the poppet valve unit to a closed chamber 21. A biasing spring 2 is positioned in chamber 21 and forces the valve stem 18 in the direction of the seating means 17 and the inlet 15.

The above description illustrates one form of a standard valve as is well known in the hydraulic art. The improvement as claimed in this invention consists of a floating nose 23 which is an annular element having two spherical surfaces 24a and 24b with a flat portion 28 therebetween. As is illustrated in FIGURE 1 and in more detail in FIGURE 2, the floating nose 23 surrounds one end of the valve stem 18 and is retained on the valve stem by a retainer ring 25. Thus, the floating nose 23 is located between the seating means 17 and a shoulder 30 on the valve stem 18. As is illustrated the floating nose makes a loose fit with the valve stem and this thereby allows movement of the floating nose on the valve stem and further creates a gap 32 as shown in FIGURE 2.

FIGURE 3 represents a possible contruction of the floating nose 23 wherein the spherical peripheries of the floating nose are formed by radii originating at specified points 26a and 26b. It is not necessary that the radii be identical or that a line drawn between the two centers 26a and 26b be coincident with the bore of the nose 27 or the outside diameter of the nose 28 as is shown in the drawing as long as a spherical surface or periphery on the nose is created. However, for easy manufacture and to provide a constant element which will operate in all similarly sized poppet valve units, it is generally considered good manufacturing custom to provide center points for the spherical radii on a center line concentric with the bore and outside diameter of the floating nose.

In operation fluid flow enters from the inlet 15 into the bore 12 and pushes against the valve stem 18 and the floating nose 23. The fluid also enters the hole 20 of the valve stem 18 and fills the chamber 21 thereby eliminating any hydraulic lock which may tend to prohibit movement of the valve stem. As the fluid flow reaches a pressure which will overcome the force of the biasing spring 22 (it will be noted here that the internal pressure in chamber 21 pushes against a smaller area than the external pressure pushing against the valve stem and floating nose) the valve stem 18 moves to the right as shown in FIGURE 1 thereby permitting fluid flow into chamber 16 and thereby to the outlet which as described hereinabove is located in chamber 16. As the pressure in bore 12 decreases when the fluid flow from the inlet 15 ceases, the biasing spring 22 moves the valve stem 18 and floating nose 23 to the left thereby closing the fluid outlet from the fluid inlet and prohibiting all fluid flow through the poppet valve unit. It will be noted that when the valve stem moves to the right, the retaining ring 25 will hold the floating nose on the valve stem. It will be further noted that when the valve stem and floating nose are in closed position as shown in FIGURE 1, although it is possible for fluid flow to pass between the floating nose 23 and the valve stem end as through gap 32, the floating nose forms a seal with shoulder 30 of the valve stem thereby prohibiting any fluid flow into chamber 16 when the poppet valve unit 10 is in closed position.

Referring now to the enlaged structure in FIGURE 2, it can easily be seen that even though the floating nose 23 is not exactly aligned with the valve stem 18, the spherical periphery 24a and b will still maintain a fluid tight seal. This can occur should the centers of the valve stem 18 and the bore 12 be in slight misalignment as shown. For example, stem 18 seals on surface 24a because nose 23 is aligned such that the center line for the sealing edge of stem 18 passes through center 26a. Simultaneously, nose 23 rotates around center 26a until center 26b is on the center line for the sealing edge of seat 17, thus allowing a seal on surface 24b. Therefore, nose 23 provides spherical sealing surfaces for two independently aligned parts.

Thus, it has been shown that a floating nose on a valve stem in a poppet valve unit can be provided to give a constant seal against any fluid flow even if the construction and alignment of the poppet valve unit is not exactly perfect. The slight permitted movement of the floating nose on the valve stem plus the spherical periphery of the floating nose cooperate to correct any misalignment in the constuction of the valve and thereby permit mass manufacturing techniques allowing less critical machining tolerances, but still provide a completely positive fluid tight seal and a smooth operating poppet valve unit to permit fluid flow or the discontinuation of fluid flow therethrough.

What is claimed is:

1. A poppet valve for use in a fluid system having a valve housing with an inlet and an outlet, a bore in the housing communicating with the inlet and outlet, and annular seating means positioned in the bore between the inlet and outlet, the valve including the combination of: a valve stem having an annular shoulder, the valve stem being mounted in the bore for axial sliding movement to and from the seating means; means normally biasing the valve stem to the seating means; an annular floating nose portion loosely mounted on the valve stem between the seating means and shoulder, the nose portion being formed with first and second axially spaced spherical surfaces facing radially outwardy from the centroid of the nose portion, the first surface cooperating with the seating means to form a fluid seal therewith, and the second surface cooperating with the shoulder to form a fluid seal therewith; and, locking means for retaining the nose portion on the valve stem.

References Cited
UNITED STATES PATENTS

| | | | |
|---|---|---|---|
| 2,713,986 | 7/1955 | Suthann | 251—86 |
| 2,982,299 | 5/1961 | Ksieski et al. | 251—86 X |

FOREIGN PATENTS

| | | |
|---|---|---|
| 1,101,840 | 4/1955 | France. |
| 1,193,775 | 5/1959 | France. |

WILLIAM F. O'DEA, *Primary Examiner.*

DENNIS H. LAMBERT, *Assistant Examiner.*